(12) United States Patent
Byun et al.

(10) Patent No.: US 10,090,506 B2
(45) Date of Patent: Oct. 2, 2018

(54) RECHARGEABLE BATTERY

(71) Applicant: SAMSUNG SDI CO., LTD., Yongin-si, Gyeonggi-do (KR)

(72) Inventors: Sang-Won Byun, Yongin-si (KR); Seok-Yoon Yoo, Yongin-si (KR); Hyun-Soo Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 424 days.

(21) Appl. No.: 14/659,354

(22) Filed: Mar. 16, 2015

(65) Prior Publication Data
US 2015/0349318 A1   Dec. 3, 2015

(30) Foreign Application Priority Data

May 28, 2014   (KR) .................. 10-2014-0064739

(51) Int. Cl.
| | |
|---|---|
| H01M 2/30 | (2006.01) |
| H01M 2/22 | (2006.01) |
| H01M 10/04 | (2006.01) |
| H01M 10/02 | (2006.01) |
| H01M 2/26 | (2006.01) |

(52) U.S. Cl.
CPC ............. *H01M 2/30* (2013.01); *H01M 2/266* (2013.01)

(58) Field of Classification Search
None
See application file for complete search history.

(56) References Cited

U.S. PATENT DOCUMENTS

| | | | | |
|---|---|---|---|---|
| 3,042,094 | A * | 7/1962 | Liljeberg | .............. F16B 13/066 411/271 |
| 2011/0244317 | A1* | 10/2011 | Lee | ..................... H01M 2/0473 429/182 |
| 2012/0177978 | A1* | 7/2012 | Kim | ........................ H01M 2/30 429/159 |

FOREIGN PATENT DOCUMENTS

| | | | |
|---|---|---|---|
| JP | 2012-079456 | * 4/2012 | ............. H01M 2/30 |
| JP | 2012-079456 A | 4/2012 | |
| KR | 10-2013-0039466 A | 4/2013 | |

OTHER PUBLICATIONS

English translation of JP 2012-079456 (2012).*
Patent Abstracts of Japan and Machine English Translation of JP 2012-79456 A, Apr. 19, 2012, 11 Pages.

* cited by examiner

*Primary Examiner* — Yoshitoshi Takeuchi
(74) *Attorney, Agent, or Firm* — Lewis Roca Rothgerber Christie LLP (57) ABSTRACT

A rechargeable battery includes: an electrode assembly including a first electrode and a second electrode; an electrode terminal configured to be electrically coupled to the electrode assembly; a case configured to accommodate the electrode assembly; and a cap plate mounted at an opening of the case, the cap plate having a terminal hole. The electrode terminal includes: a first terminal at the terminal hole of the cap plate and configured to be electrically coupled to the electrode assembly; a second terminal at an exterior side of the cap plate and configured to be electrically coupled to the first terminal such that the first terminal is exposed to an exterior of the case; and a third terminal on the second terminal and configured to be elastically deformable and electrically coupled to the first terminal through the second terminal.

6 Claims, 6 Drawing Sheets

RECHARGEABLE BATTERY

CROSS-REFERENCE TO RELATED APPLICATION

This application claims priority to and the benefit of Korean Patent Application No. 10-2014-0064739 filed in the Korean Intellectual Property Office on May 28, 2014, the entire content of which is incorporated herein by reference.

BACKGROUND

1. Field

An example embodiment of the present invention relates to a rechargeable battery.

2. Description of the Related Art

A rechargeable battery can be repeatedly charged and discharged, unlike a primary battery that is not designed to be recharged. A low capacity rechargeable battery is used for a small portable electronic device such as a mobile phone, a laptop computer, and a camcorder, and a large capacity battery is widely used as a power source for driving a motor of a hybrid vehicle, etc.

Examples of a representative rechargeable battery include a nickel-cadmium (Ni—Cd) battery, a nickel-metal hydride (Ni-MH) battery, a lithium (Li) battery, and a lithium ion (Li-ion) rechargeable battery. The lithium ion secondary battery has a higher operation voltage (e.g., by a factor of about three times) than either of the nickel-cadmium battery or the nickel-metal hydride battery, which are used as a portable electric equipment power source. Further, the lithium ion rechargeable battery has been widely used since its energy density per unit weight is high.

The rechargeable battery mainly uses a lithium-based oxide as a positive electrode active material and a carbonaceous material as a negative electrode active material. In general, the rechargeable battery is classified as a liquid electrolyte battery or a polymer electrolyte battery according to a kind of electrolyte. A battery including the liquid electrolyte is referred to as a lithium ion battery, while a battery including the polymer electrolyte is referred to as a lithium polymer battery.

The lithium polymer battery, however, may partially swell when being continuously (or substantially continuously) used. In this case, a portion of a bus bar coupled to (e.g., connected to) an electrode terminal may be broken.

The above information disclosed in this Background section is only for enhancement of understanding of the background of the invention and therefore it may contain information that does not form the prior art that is already known in this country to a person of ordinary skill in the art.

SUMMARY

Aspects of embodiments of the present invention are directed toward a rechargeable battery having features of preventing a coupled portion (e.g., a connected portion) of an electrode terminal of the rechargeable battery to a bus bar from being broken (or reducing a likelihood or amount of damage to the coupled portion of the electrode terminal).

According to an example embodiment of the present invention, a rechargeable battery includes: an electrode assembly including a first electrode and a second electrode; an electrode terminal configured to be electrically coupled to the electrode assembly; a case configured to accommodate the electrode assembly; and a cap plate at an opening of the case, the cap plate having a terminal hole.

The electrode terminal includes: a first terminal at the terminal hole of the cap plate and configured to be electrically coupled to the electrode assembly; a second terminal at an exterior side of the cap plate and configured to be electrically coupled to the first terminal such that the first terminal is exposed to an exterior of the case; and a third terminal on the second terminal and configured to be elastically deformable and electrically coupled to the first terminal through the second terminal.

The second terminal may include an accommodating groove to accommodate the third terminal.

The accommodating groove may have a multi-stage to have at least two mounting surfaces.

The at least two mounting surfaces may include a first mounting surface contacting one side surface of the third terminal, and a second mounting surface stepped from (or with) the first mounting surface of the second terminal.

The third terminal may include: a terminal plate on the first mounting surface of the second terminal and electrically coupled to the first terminal; and a terminal protrusion protruded from the terminal plate and configured to be electrically coupled to a bus bar.

An edge of the terminal plate may be welded to the first mounting surface.

The terminal protrusion may include at least two protrusions protruded from the terminal plate.

A stopper plate may be on the second mounting surface and have one side coupled to the second mounting surface and an other side protruded along a side surface of the terminal protrusion, the terminal protrusion being deformed to contact the stopper plate.

A catching protrusion may be protruded from the side surface of the terminal protrusion, the catching protrusion being configured to couple to the bus bar.

According to an example embodiment of the present invention, the electrode terminal can be deformed (e.g., partially deformed). However, even when the bus bar and the rechargeable battery are deformed, it is possible to prevent a coupled portion (e.g., a connection portion) between the bus bar and the electrode terminal from being broken (or to reduce a likelihood or amount of damage to the coupled portion), thereby improving stability of the rechargeable battery

BRIEF DESCRIPTION OF THE DRAWINGS

The accompanying drawings, together with the specification, illustrate embodiments of the present invention, and, together with the description, serve to explain the principles of the present invention.

DETAILED DESCRIPTION

Embodiments of the present invention will be described more fully hereinafter with reference to the accompanying drawings, in which example embodiments of the invention are shown, by way of illustration. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification. As used herein, the term "hole" may refer to an opening or aperture. Additionally, when a first element is described as being "coupled" or "connected" to a second element, the first element may be directly coupled or connected to the second element or indirectly coupled or connected to the second element with one or more other elements interposed therebetween.

Figure 1:
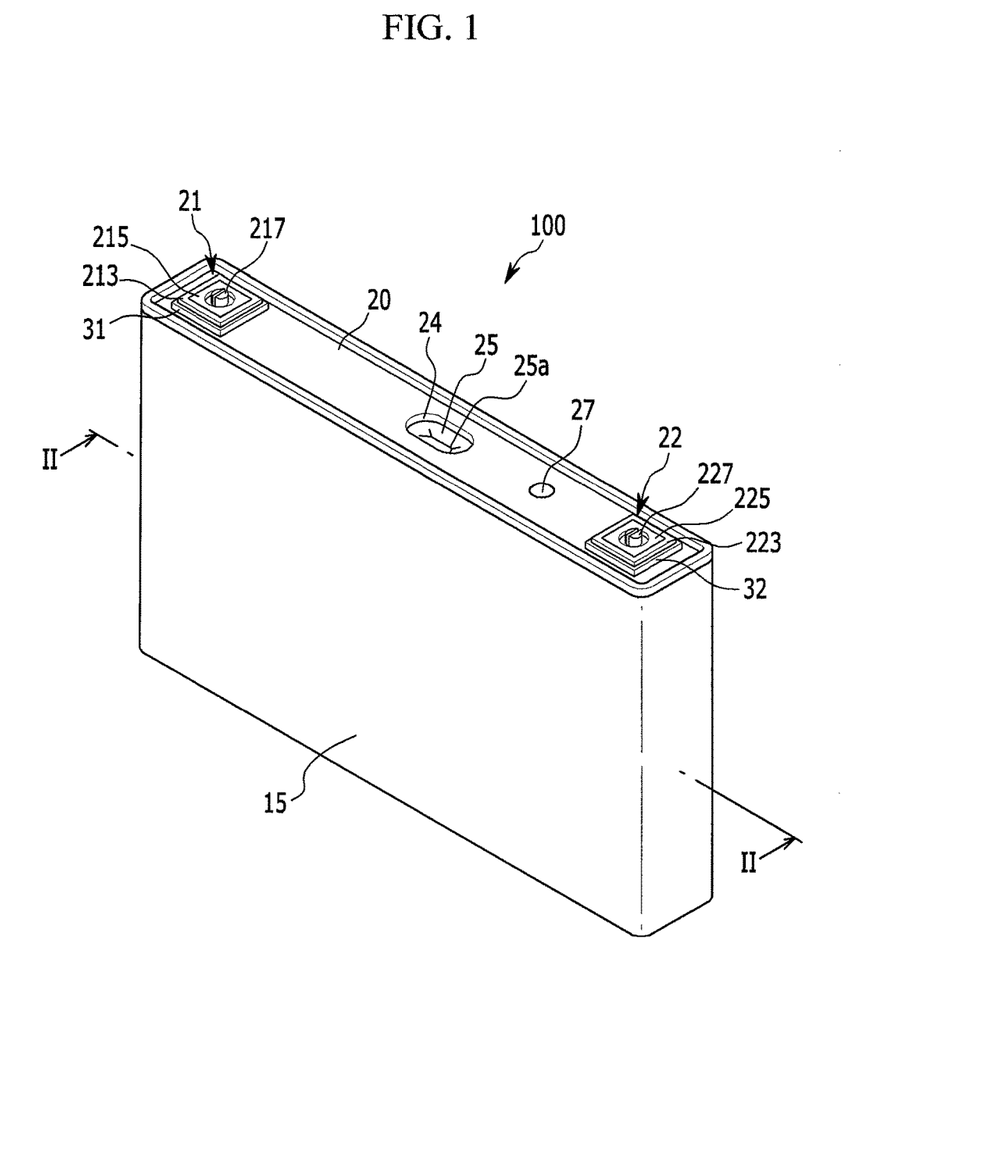
FIG. 1 is a schematic perspective view of a rechargeable battery according to a first example embodiment of the present invention.
Figure 2:
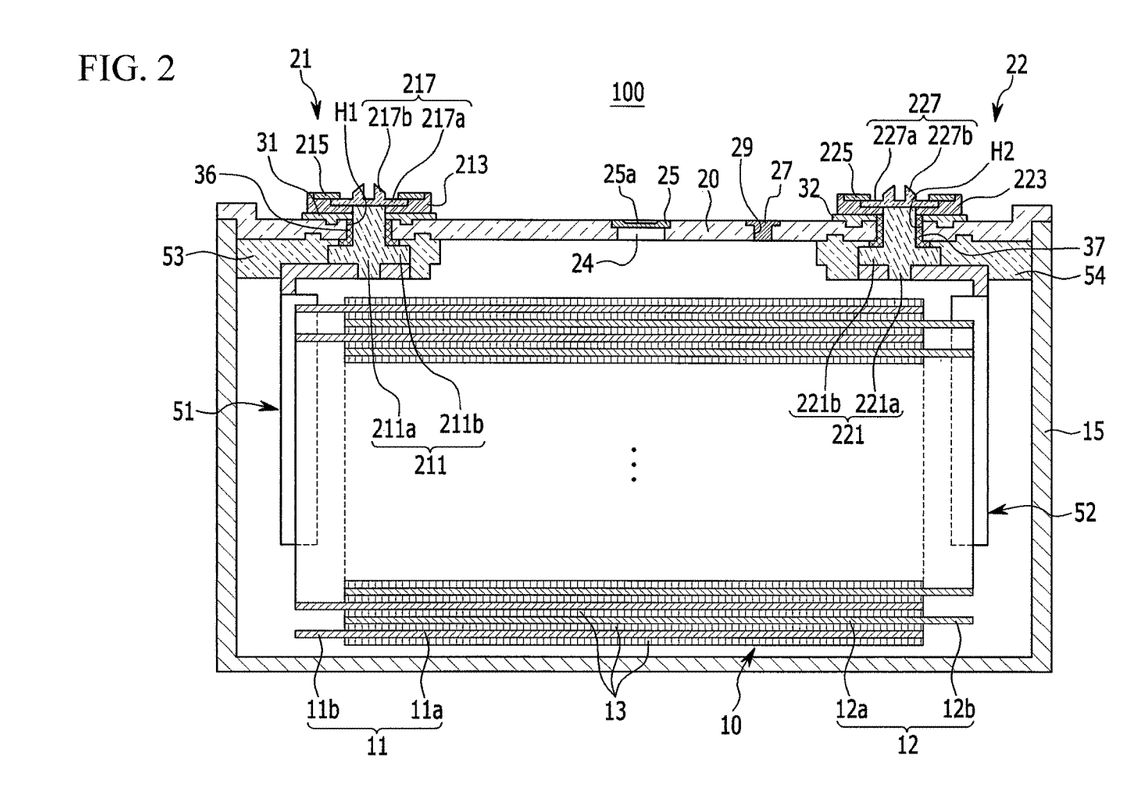
FIG. 2 is a cross-sectional view taken along a line II-II of FIG. 1.
Figure 3:
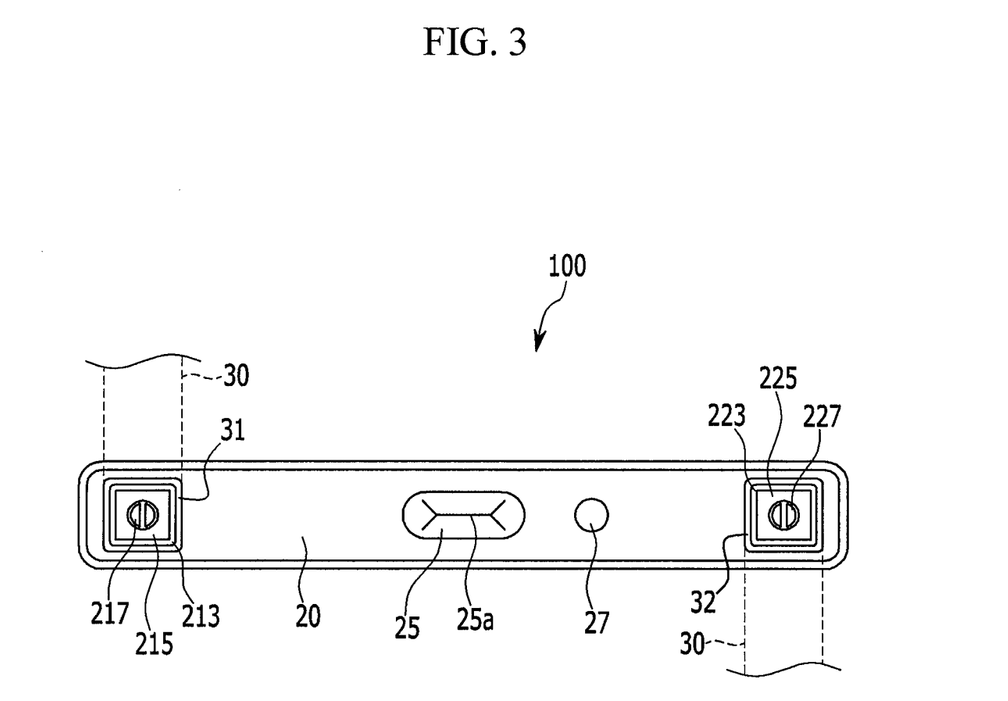
FIG. 3 is a schematic top plan view of the rechargeable battery of FIG. 1 in a state in which a bus bar is coupled to (e.g., connected to) the rechargeable battery.

FIG. 1 is a schematic perspective view illustrating a rechargeable battery according to a first example embodiment of the present invention, FIG. 2 is a cross-sectional view taken along the line II-II of FIG. 1, and FIG. 3 is a schematic top plan view illustrating the rechargeable battery of FIG. 1 in a state in which a bus bar is coupled to (e.g., connected to) the rechargeable battery.

An example embodiment of the present invention relates to a rechargeable battery that facilitates a set (or predetermined) displacement movement of an electrode terminal and prevents a portion coupled to (e.g., connected to) a bus bar from being damaged (or reduces a likelihood or amount of such damage). As shown in FIG. 1 to FIG. 3, the rechargeable battery 100 according to the first example embodiment of the present invention includes: an electrode assembly 10 for charging and discharging a current; electrode terminals 21 and 22 electrically coupled to (e.g., electrically connected to) the electrode assembly 10; a case 15 for accommodating the electrode assembly 10; and a cap plate 20 mounted at an opening of the case 15 to close and seal the case 15 and having (e.g., formed with) terminal holes H1 and H2.

For example, the electrode assembly 10 is formed by disposing a first electrode (hereinafter referred to as "a negative electrode") 11 and a second electrode (hereinafter referred to as "a positive electrode") 12 on opposite surfaces of a separator 13 serving as an insulator, and winding the negative electrode 11, the separator 13, and the positive electrode 12 in a jelly-roll shape.

The negative and positive electrodes 11 and 12 include coated regions 11a and 12a formed by applying an active material to a current collector made of a metal plate, and uncoated regions 11b and 12b which are exposed portions of the current collector to which the active material is not applied (e.g., portions of the current collector that do not include the active material).

The uncoated region 11b of the negative electrode 11 is located (or formed) at a first end of the negative electrode 11 along the wound negative electrode 11. The uncoated region 12b of the positive electrode 12 is located (or formed) at a second end of the positive electrode 12 along the wound positive electrode 12. As a result, the uncoated regions 11b and 12b of the negative electrode 11 and the positive electrode 12 are respectively disposed at opposite ends of the electrode assembly 10.

The cap plate 20 is mounted at the opening of the case 15 to close and seal the case 15. For example, the case 15 and the cap plate 20 are formed of aluminum and are welded to each other.

The cap plate 20 further includes an electrolyte injection opening 29, a vent hole 24, and the terminal holes H1 and H2. After the cap plate 20 is coupled with the case 15, the electrolyte injection opening 29 is located (or used) to inject the electrolyte solution into the case 15. After the electrolyte solution is injected, the electrolyte injection opening 29 is sealed by a sealing stopper 27.

The vent hole 24 is closed and sealed with a vent plate 25 so that internal pressure of the rechargeable battery 100 may be discharged. If the internal pressure of the rechargeable battery 100 reaches a set (or predetermined) pressure, the vent plate 25 is ruptured to open the vent hole 24. The vent plate 25 includes a notch 25a for inducing the rupture.

The negative electrode terminal 21 and the positive electrode terminal 22 are respectively mounted in the terminal holes H1 and H2 of the cap plate 20 and are electrically coupled to (e.g., electrically connected to) the electrode assembly 10. For example, the negative electrode terminal 21 is electrically coupled to (e.g., electrically connected to) the negative electrode 11 of the electrode assembly 10, and the positive electrode terminal 22 is electrically coupled to (e.g., electrically connected to) the positive electrode 12 of the electrode assembly 10. Accordingly, an electric current from the electrode assembly 10 may be drawn outside the case 15 through the negative electrode terminal 21 and the positive electrode terminal 22.

The electrode terminals 21 and 22 will be described together as follows. The electrode terminals 21 and 22 respectively include first terminals 211 and 221 at (e.g., mounted in) the terminal holes H1 and H2, respectively, of the cap plate 20 to be electrically coupled to (e.g., electrically connected to) the electrode assembly 10. The electrode terminals 21 and 22 further respectively include second terminals 213 and 223 disposed outside the cap plate 20 (e.g., at an exterior side of the cap plate 20) to be electrically coupled to (e.g., electrically connected to) the first terminals 211 and 221, respectively, such that the first terminals 211 and 221 are exposed. The electrode terminals 21 and 22 further respectively include third terminals 217 and 227 electrically coupled to (e.g., electrically connected to) the first terminals 211 and 221, respectively, through the second terminals 213 and 223 and at (e.g., mounted on) the second terminals 213 and 223, respectively, to be elastically deformable.

The first terminals 211 and 221, which are respectively mounted at (e.g., in) the terminal holes H1 and H2 of the cap plate 20 to be electrically coupled to (e.g., electrically connected to) the electrode assembly 10, respectively include rivet terminals 211a and 221a mounted at (e.g., in) the terminal holes H1 and H2, and flanges 211b and 221b at (e.g., widely integrally formed at) the rivet terminals 211a and 221a, respectively, inside the case 15.

End portions of the first terminals 211 and 221 protrude outside of the cap plate 20, and the protruded end portions of the first terminals 211 and 221 are respectively inserted into the second terminals 213 and 223.

Figure 4:
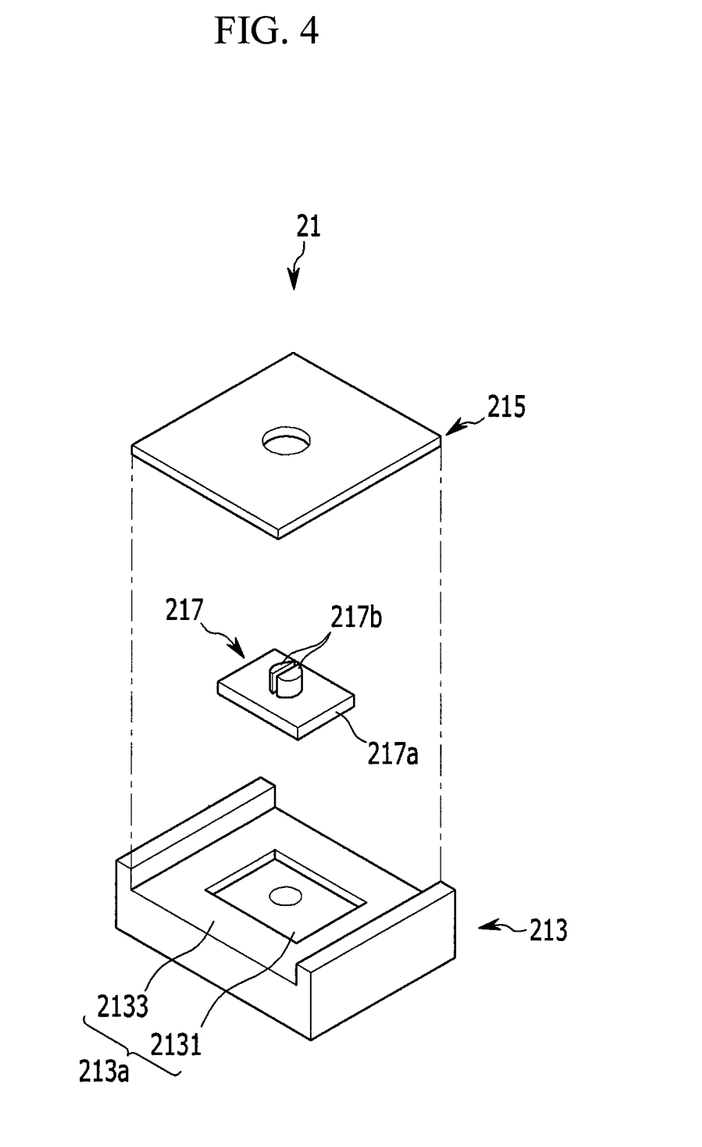
FIG. 4 is a schematic exploded perspective view of an electrode terminal in a mounting state in which a second terminal, a third terminal, and stopper plate are mounted together.
Figure 5:
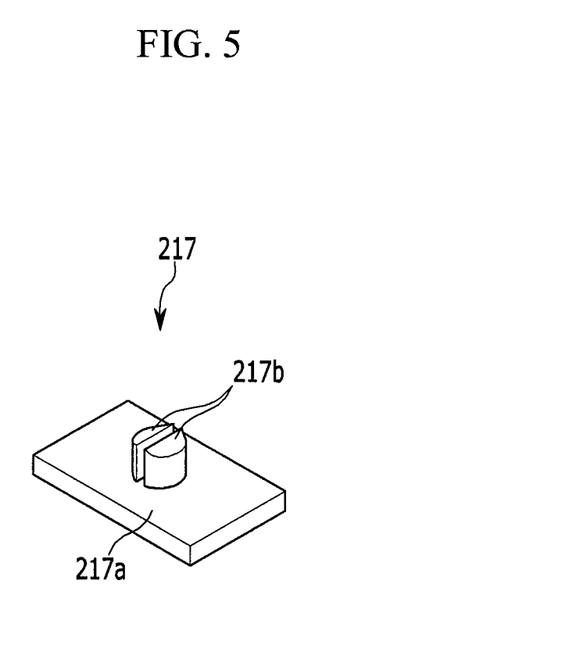
FIG. 5 is a schematic perspective view of the third terminal of the electrode terminal of FIG. 4.

FIG. 4 is a schematic exploded perspective view illustrating a mounting state of an electrode terminal in which a second terminal, a third terminal, and a stopper plate are mounted. FIG. 5 is a schematic perspective view of the third terminal of FIG. 4.

As shown in FIG. 4 and FIG. 5, the second terminals 213 and 223, which are respectively electrically coupled to (e.g., electrically connected to) the first terminal 211 and 221, may be respectively extended on (or along) the cap plate 20 along side surfaces of the protruded end portions of the first terminals 211 and 221. The second terminals 213 and 223 are respectively coupled to (e.g., connected to) the first terminals 211 and 221 by, for example, welding, but the present invention is not limited thereto. For example, in some embodiments, the second terminals 213 and 223 may be respectively coupled to (e.g., connected to) the first terminals 211 and 221 by riveting. Accommodating grooves 213a in which the third terminals 217 and 227 are respectively mounted while respectively exposing the end portions of the first terminals 211 and 221 may be at (e.g., formed in) the second terminals 213 and 223, respectively. In FIG. 4, the accommodating groove 213a is shown with respect to the second terminal 213. The accommodating groove 213a at the second terminal 223 has the same (or substantially the same) structure as that shown in FIG. 4.

The accommodating grooves 213a may be at (e.g., formed at) the second terminals 213 and 223, respectively, and each accommodating groove 213a may have at least two mounting surfaces. For example, the mounting surfaces at (e.g., formed at) the accommodating grooves 213a may include a first mounting surface 2131 and a second mounting surface 2133 which are (e.g., are formed to be) stepped.

The first mounting surface 2131 is a portion (e.g., a part) on which one side surface of each of the respective third terminals 217 and 227 is mounted by being contacted thereon. The first mounting surface 2131 may be (e.g., may be widely formed) along respective side surfaces of the third terminals 217 and 227 based on the protruded end portions of the first terminals 211 and 221, respectively. The first mounting surfaces 2131 may be electrically coupled to (e.g., electrically connected to) the third terminals 217 and 227, respectively, by, for example, welding. Welding between the first mounting surface 2131 and the third terminal 217 or 227 may be performed at an edge coupling (e.g., connecting) the first mounting surface 2131 to the second mounting surface 2133.

The second mounting surface 2133 may be formed at the first mounting surface 2131 to be stepped, and stopper plates 215 and 225 may be respectively mounted at the stepped portion. Respective portions (e.g., parts) of the stopper plates 215 and 225 may be respectively mounted at the second mounting surface 2133 to be electrically coupled thereto (e.g., electrically connected thereto) by, for example, welding or the like. The stopper plates 215 and 225 are respectively mounted to suppress (or reduce) excessive elastic deformation of the third terminals 217 and 227, respectively, which is described in more detail with respect to the stopper plates 215 and 225.

As described above, the third terminal 217 or 227 is mounted on the second mounting surface 2133 while being electrically coupled thereto (e.g., connected thereto), in order to respectively electrically couple (e.g., electrically connect) the first terminals 211 and 221 to bus bars 30.

The third terminals 217 and 227 respectively include terminal plates 217a and 227a respectively mounted on the first mounting surface 2131 in the second terminals 213 and 223, respectively, to be electrically coupled to (e.g., electrically connected to) the first terminal 211 or 221. The third terminals 217 and 227 further respectively include terminal protrusions 217b and 227b protruded from the terminal plate 217a and 227a to be electrically coupled to (e.g., electrically connected to) the bus bars 30, respectively.

A side surface of the terminal plate 217a or 227a may be mounted on the first mounting surface 2131 from an upper side of the first terminal 211 or 221 while contacting the first terminal 211 or 221 of which an end portion is protruded. An edge of the terminal plate 217a or 227a can be electrically coupled to (e.g., electrically connected to) the first terminal 211 or 221 by being welded to the first mounting surface 2131. In the present example embodiment, each of the terminal plates 217a and 227a may include (e.g., be formed of), for example, an aluminum material. A plurality of terminals protrusions 217b or 227b may be protruded from the terminal plate 217a or 227a.

The plurality of terminal protrusions 217b or 227b may be integrally formed at (e.g., in) the terminal plate 217a or 227a by using the same (or substantially the same) material as that of the terminal plate 217a or 227a, and a portion (e.g., a part) of the terminal protrusion 217b or 227b may be protruded to be exposed to the outside of the second terminal 213 or 223. As a result, the portions (e.g., the parts) of the plurality of terminal protrusions 217b or 227b that are protruded to be exposed to the outside of the second terminal 213 or 223 may be easily respectively coupled to (e.g., connected to) the bus bars 30.

The plurality of terminal protrusions 217b and 227b may each include a pair of terminal protrusions that face each other and are respectively protruded from the terminal plates 217a and 227a, to be stably coupled to (e.g., connected to) the bus bars 30, respectively. The plurality of terminal protrusions 217b and 227b may be formed to each have a semicircular cross-section, and may be coupled to (e.g., connected to) the respective bus bar 30 by being inserted into a coupling hole (e.g., a connection hole) at (e.g., formed in) the bus bar 30. As a result, the respective protruded end portion of the plurality terminal protrusions 217b and 227b and the coupling hole (e.g., the connection hole) of the respective bus bar 30 are electrically coupled to (e.g., electrically connected to) each other by, for example, being welded to each other. For example, in the present example embodiment, the plurality of terminal protrusions 217a and 227b each has two protrusions that protrude from the terminal plate 217a or 227a, but the present invention is not limited thereto. For example, in some embodiments, at least three protrusions may be radially protruded from the terminal plate 217a or 227a.

The plurality of terminal protrusions 217b and 227b may be elastically deformed in a space of the respective accommodating groove 213a while being coupled to (e.g., connected to) the respective bus bar 30. For example, when the rechargeable battery 100 is swelled and deformed while being continuously (or substantially continuously) used, the plurality of terminal protrusions 217b and 227b are elastically deformable in a state of being coupled to (e.g., connected to) the respective bus bar 30. Accordingly, even when the rechargeable battery 100 is deformed, the coupling (e.g., connection) between the terminal protrusions 217b and 227b and the respective bus bar 30 can be stably made (or maintained) without being broken (or damaged). As a result, it is possible to improve the stability of the rechargeable battery 100.

Negative and positive electrode gaskets 36 and 37 are respectively mounted between the rivet terminals 211a and 221a of the negative electrode 21 and the positive electrode 22 and inner surfaces of the terminal holes H1 and H2 of the cap plate 20 to perform sealing and electrical insulation of respective gaps between the cap plate 20 and a respective one of the rivet terminal 211a and 221a of the negative electrode 21 and the positive electrode 22.

Further, the negative and positive electrode gaskets 36 and 37 are respectively extended and mounted between the flanges 211b and 221b and an inner surface of the cap plate 20 to perform sealing and electrical insulation of respective gaps between the cap plate 20 and a respective one of the flanges 211b and 221b. As a result, the negative and positive electrode gaskets 36 and 37 are respectively used to mount the negative terminal 21 and the positive terminal 22 in order to prevent the electrolyte solution from leaking through the terminal holes H1 and H2 (or to reduce a likelihood or amount of such leakage).

Negative and positive electrode current collecting tabs 51 and 52 respectively electrically couple (e.g., electrically connect) the negative terminal 21 and the positive terminal 22 to the respective negative electrode 11 and the positive electrode 12 of the electrode assembly 10. For example, the negative and positive electrode current collecting tabs 51 and 52 are respectively coupled to (e.g., connected to) lower ends of the rivet terminals 211a and 221a while being supported by the respective flanges 211b and 221b by coupling the negative and positive electrode current collecting tabs 51 and 52 to the respective lower ends of the rivet terminals 211a and 221a to caulk the lower ends thereof.

Lower insulation members 53 and 54 are respectively mounted between the cap plate 20 and the negative and positive electrode current collecting tabs 51 and 52 to electrically insulate a respective one of the negative and positive electrode current collecting tabs 51 and 52 from the cap plate 20. Further, the lower insulation members 53 and 54 respectively have one side coupled to the cap plate 20 and an other side that surrounds respective ones the negative and positive current collecting tabs 51 and 52, the rivet terminals 211a and 221a, and the flanges 211b and 221b, thereby stabilizing a coupling (e.g., connection) structure therebetween.

An upper insulation member 31 at a side of the negative terminal 21 is mounted between the first terminal 211 and the cap plate 20 to electrically insulate the first terminal 211 from the cap plate 20. As a result, the cap plate 20 maintains (or is in) a state of being electrically insulated from the negative terminal 21.

For example, the upper insulation member 31 is interposed between the first terminal 211 and the cap plate 20, and is penetrated by the rivet terminal 211a. Accordingly, the upper insulation member 31 and the first terminal 211 are adhered to an upper end of the rivet terminal 211a by coupling the upper insulation member 31 and the first terminal 211 to the upper end of the rivet terminal 211a to caulk the upper end thereof.

The negative electrode gasket 36 is further extended and mounted between the rivet terminal 211a and the upper insulation member 31. For example, the negative electrode gasket 36 serves to reinforce the sealing and the electrical insulation of (or on) the gap between the rivet terminal 211a and the upper insulation member 31.

A top plate 32 at a side of the positive electrode terminal 22 includes (or is formed of) a conductive member, and is mounted between the first terminal 221 and the cap plate 20 to electrically couple (e.g., electrically connect) the first terminal 221 to the cap plate 20. As a result, the cap plate 20 maintains (or is in) a state of being electrically coupled to (e.g., electrically connected to) the electrode assembly 10 through the positive electrode terminal 22.

For example, the top plate 32 is interposed between the first terminal 221 and the cap plate 20, and is penetrated by the rivet terminal 221a. Accordingly, the top plate 32 and the first terminal 221 are adhered to an upper end of the rivet terminal 221a by coupling the top plate 32 and the first terminal 221 to the upper end of the rivet terminal 221a to caulk the upper end thereof.

The negative electrode gasket 37 is further extended and mounted between the rivet terminal 221a and the top plate 32. For example, the positive electrode gasket 37 serves to prevent the rivet terminal 221a and the top plate 32 from being directly electrically coupled to (e.g., electrically connected to) each other (or to reduce a likelihood or amount of such a direct electrical coupling or connection). As a result, the rivet terminal 221a is electrically coupled to (e.g., electrically connected to) the top plate 32 through the first terminal 221, and is electrically coupled to (e.g., electrically connected to) the cap plate 20 through the top plate 32.

Figure 6:
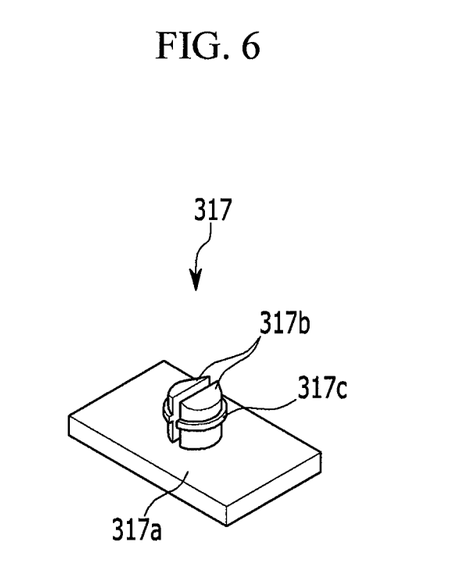
FIG. 6 is a schematic perspective view of a third terminal according to a second example embodiment of the present invention.

FIG. 6 is a schematic perspective view illustrating a third terminal according to a second example embodiment of the present invention. The same reference numerals in FIG. 1 to FIG. 5 indicate the same (or substantially the same) members with the same (or substantially the same) functions. Some of the detailed description of the same reference numerals in FIG. 1 to FIG. 5 will not be repeated here.

According to the second example embodiment shown in FIG. 6, electrode terminals of the rechargeable battery respectively include the first terminals 211 and 221 mounted in the terminal holes H1 and H2 of the cap plate 20 to be electrically coupled to (e.g., electrically connected to) the electrode assembly 10. The second terminals 213 and 223 are disposed outside the cap plate 20 to be electrically coupled to (e.g., electrically connected to) the first terminals 211 and 221, respectively, such that the first terminals 211 and 221 are exposed. Third terminals 317 electrically coupled to (e.g., electrically connected to) the first terminals 211 and 221, respectively, through a respective one of the second terminals 213 and 223 and mounted on the respective second terminals 213 and 223 to be elastically deformable. A catching protrusion 317c may be protruded on a side surface of the each of the third terminals 317, which include terminal plates 317a.

The catching protrusion 317c serves to stably maintain an inserted state of the third terminal 317 into an insertion hole at (e.g., formed on) the respective bus bar 30, and can facilitate further stable coupling (e.g., connection) between the respective third terminal 317 and bus bar 30. For example, even when an error (e.g., a defect) is generated (or is present) at a welded portion between a terminal protrusion 317b of the third terminal 317 and the respective bus bar 30, it is possible to maintain a coupling state between the respective bus bar 30 and terminal protrusion 317b to a certain degree by way of (e.g., by using) the catching protrusion 317c, thereby maintaining a more stable coupling (e.g., connection) state.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims, and equivalents thereof.

| Description of Symbols | |
|---|---|
| 10. electrode assembly | 11. first electrode |
| 11a, 12a. coated region | 11b, 12b. uncoated region |
| 12. second electrode | 15. case |
| 20. cap plate | 21, 22. electrode terminal |
| 24. vent hole | 25. vent plate |

| Description of Symbols | |
|---|---|
| 31. upper insulation member | 32. top plate |
| 36. negative electrode gasket | 37. positive electrode gasket |
| 51. negative electrode current collecting tab | |
| 52. positive electrode current collecting tab | |
| 53, 54. lower insulation member | |

What is claimed is:

1. A rechargeable battery comprising:
an electrode assembly comprising a first electrode and a second electrode;
an electrode terminal configured to be electrically coupled to the electrode assembly;
a case configured to accommodate the electrode assembly; and
a cap plate at an opening of the case, the cap plate having a terminal hole,
wherein the electrode terminal comprises:
a first terminal at the terminal hole of the cap plate and configured to be electrically coupled to the electrode assembly;
a second terminal at an exterior side of the cap plate and configured to be electrically coupled to the first terminal such that the first terminal is electrically coupled to an exterior of the case; and
a third terminal on the second terminal and configured to be elastically deformable and electrically coupled to the first terminal through the second terminal,
wherein the third terminal does not include a plurality of threads,
wherein the second terminal comprises an accommodating groove to accommodate the third terminal,
wherein the accommodating groove has a multi-stage to have at least two mounting surfaces,
wherein the at least two mounting surfaces comprise:
a first mounting surface contacting one side surface of the third terminal; and
a second mounting surface stepped from the first mounting surface and wider than the first mounting surface, and
wherein a stopper plate is on the second mounting surface and has one side coupled to the second mounting surface.

2. The rechargeable battery of claim 1, wherein the third terminal comprises:
a terminal plate on the first mounting surface of the second terminal and electrically coupled to the first terminal; and
a terminal protrusion protruded from the terminal plate and configured to be electrically coupled to a bus bar.

3. The rechargeable battery of claim 2, wherein an edge of the terminal plate is welded to the first mounting surface.

4. The rechargeable battery of claim 2, wherein the terminal protrusion comprises at least two protrusions protruded from the terminal plate.

5. A rechargeable battery comprising:
an electrode assembly comprising a first electrode and a second electrode;
an electrode terminal configured to be electrically coupled to the electrode assembly;
a case configured to accommodate the electrode assembly; and
a cap plate at an opening of the case, the cap plate having a terminal hole,
wherein the electrode terminal comprises:
a first terminal at the terminal hole of the cap plate and configured to be electrically coupled to the electrode assembly;
a second terminal at an exterior side of the cap plate and configured to be electrically coupled to the first terminal such that the first terminal is electrically coupled to an exterior of the case; and
a third terminal on the second terminal and configured to be elastically deformable and electrically coupled to the first terminal through the second terminal,
wherein the third terminal does not include a plurality of threads,
wherein the second terminal comprises an accommodating groove to accommodate the third terminal,
wherein the accommodating groove has a multi-stage to have at least two mounting surfaces,
wherein the at least two mounting surfaces comprise:
a first mounting surface contacting one side surface of the third terminal; and
a second mounting surface stepped from the first mounting surface and wider than the first mounting surface,
wherein the third terminal comprises:
a terminal plate on the first mounting surface of the second terminal and electrically coupled to the first terminal; and
a terminal protrusion protruded from the terminal plate and configured to be electrically coupled to a bus bar,
wherein the terminal protrusion comprises at least two protrusions protruded from the terminal plate, and
wherein a stopper plate is on the second mounting surface and has one side coupled to the second mounting surface and an other side protruded along a side surface of the terminal protrusion, the terminal protrusion being deformed to contact the stopper plate.

6. A rechargeable battery comprising:
an electrode assembly comprising a first electrode and a second electrode;
an electrode terminal configured to be electrically coupled to the electrode assembly;
a case configured to accommodate the electrode assembly; and
a cap plate at an opening of the case, the cap plate having a terminal hole,
wherein the electrode terminal comprises:
a first terminal at the terminal hole of the cap plate and configured to be electrically coupled to the electrode assembly;
a second terminal at an exterior side of the cap plate and configured to be electrically coupled to the first terminal such that the first terminal is electrically coupled to an exterior of the case; and
a third terminal on the second terminal and configured to be elastically deformable and electrically coupled to the first terminal through the second terminal,
wherein the third terminal does not include a plurality of threads,
wherein the second terminal comprises an accommodating groove to accommodate the third terminal,
wherein the accommodating groove has a multi-stage to have at least two mounting surfaces,
wherein the at least two mounting surfaces comprise:
a first mounting surface contacting one side surface of the third terminal; and a second mounting surface stepped from the first mounting surface and wider than the first mounting surface,
wherein the third terminal comprises:
a terminal plate on the first mounting surface of the second terminal and electrically coupled to the first terminal; and
a terminal protrusion protruded from the terminal plate and configured to be electrically coupled to a bus bar,
wherein the terminal protrusion comprises at least two protrusions protruded from the terminal plate,
wherein a stopper plate is on the second mounting surface and has one side coupled to the second mounting surface and an other side protruded along a side surface of the terminal protrusion, the terminal protrusion being deformed to contact the stopper plate, and
wherein a catching protrusion protrudes from the side surface of the terminal protrusion, the catching protrusion being configured to couple to the bus bar.

* * * * *